US010899211B2

(12) United States Patent
Leonard et al.

(10) Patent No.: US 10,899,211 B2
(45) Date of Patent: Jan. 26, 2021

(54) BATTERY SYSTEM, HOUSING AND VEHICLE INCLUDING BATTERY SYSTEM

(71) Applicant: CPS Technology Holdings LLC, New York, NY (US)

(72) Inventors: Michael W. Leonard, West Bloomfield, MI (US); Peter A. Ojeda, Saline, MI (US); Jason Gamache, Romeo, MI (US)

(73) Assignee: CPS Technology Holdings LLC, New York, NY (US)

( * ) Notice: Subject to any disclaimer, the term of this patent is extended or adjusted under 35 U.S.C. 154(b) by 0 days.

(21) Appl. No.: 15/284,251

(22) Filed: Oct. 3, 2016

(65) Prior Publication Data

US 2017/0021712 A1   Jan. 26, 2017

Related U.S. Application Data

(62) Division of application No. 13/571,220, filed on Aug. 9, 2012, now Pat. No. 9,472,791.
(Continued)

(51) Int. Cl.
*B60K 1/04*  (2019.01)
*H01M 2/10*  (2006.01)
(Continued)

(52) U.S. Cl.
CPC ............. *B60K 1/04* (2013.01); *H01M 2/1077* (2013.01); *H01M 2/1083* (2013.01);
(Continued)

(58) Field of Classification Search
CPC ........ H01M 2/202; H01M 2/206; H01M 2/24; H01M 2/26; H01M 2/28; H01R 11/288; B60K 2001/0422; B60K 2001/0494
See application file for complete search history.

(56) References Cited

U.S. PATENT DOCUMENTS

| 5,378,555 A | 1/1995 | Waters et al. |
| 5,392,873 A | 2/1995 | Masuyama et al. |
| (Continued) | | |

FOREIGN PATENT DOCUMENTS

| EP | 2187465 A1 | 5/2010 |
| EP | 2202824 A1 | 6/2010 |
| (Continued) | | |

OTHER PUBLICATIONS

International Preliminary Report on Patentability dated Feb. 20, 2014, for International Application No. PCT/US2012/050397.
(Continued)

*Primary Examiner* — Katy M Ebner
(74) *Attorney, Agent, or Firm* — Boardman & Clark LLP

(57) ABSTRACT

A battery system for use in a vehicle is disclosed. The battery system includes a tray having a plurality of battery receptacles. A plurality of batteries are also provided, each battery in the plurality of batteries being received in a battery receptacle. A conductive layer in electrical communication with the plurality of batteries and a terminal for electrically coupling to a vehicle are also provided in the battery system. A cover interlocks with the tray. The cover carries a computer and a diagnostic identification system for the plurality of batteries. A housing for a battery system and a vehicle including a battery system are also disclosed.

19 Claims, 9 Drawing Sheets

Related U.S. Application Data

(60) Provisional application No. 61/522,497, filed on Aug. 11, 2011.

(51) Int. Cl.
   *H01M 10/42* (2006.01)
   *H01M 2/20* (2006.01)
   *H01M 10/12* (2006.01)

(52) U.S. Cl.
   CPC ........... *H01M 2/206* (2013.01); *H01M 10/12* (2013.01); *H01M 10/425* (2013.01); *B60K 2001/0422* (2013.01); *B60K 2001/0466* (2013.01); *B60Y 2200/23* (2013.01); *B60Y 2200/91* (2013.01); *H01M 2010/4278* (2013.01); *H01M 2220/20* (2013.01)

(56) References Cited

U.S. PATENT DOCUMENTS

| | | | |
|---|---|---|---|
| 5,534,364 A * | 7/1996 | Watanabe | B60L 3/0046 180/65.1 |
| 5,558,949 A * | 9/1996 | Iwatsuki | H01M 2/1083 180/68.5 |
| 6,146,778 A * | 11/2000 | Rouillard | H01M 2/1077 361/434 |
| 6,213,145 B1 | 4/2001 | Crook et al. | |
| 6,340,538 B1 | 1/2002 | King et al. | |
| 6,662,891 B2 | 12/2003 | Misu et al. | |
| 8,051,934 B2 | 11/2011 | Kiya et al. | |
| 8,256,552 B2 | 9/2012 | Okada | |
| 8,256,553 B2 * | 9/2012 | De Paschoal | B60G 3/20 180/65.1 |
| 8,561,743 B2 | 10/2013 | Ogata et al. | |
| 9,472,791 B2 | 10/2016 | Ojeda et al. | |
| 2001/0046624 A1 | 11/2001 | Goto et al. | |
| 2003/0047366 A1 | 3/2003 | Andrew et al. | |
| 2007/0284167 A1 | 12/2007 | Watanabe et al. | |
| 2009/0017368 A1 | 1/2009 | Hayashi et al. | |
| 2009/0274952 A1 * | 11/2009 | Wood | B60L 11/1874 429/99 |
| 2010/0136413 A1 | 6/2010 | Hermann et al. | |

FOREIGN PATENT DOCUMENTS

| | | |
|---|---|---|
| JP | 2004345448 A | 12/2004 |
| WO | 2010019764 A2 | 2/2010 |

OTHER PUBLICATIONS

International Search Report and Written Opinion of the International. Searching Authority dated Mar. 14, 2013, for International Application No. PCT/US2012/050397.

* cited by examiner

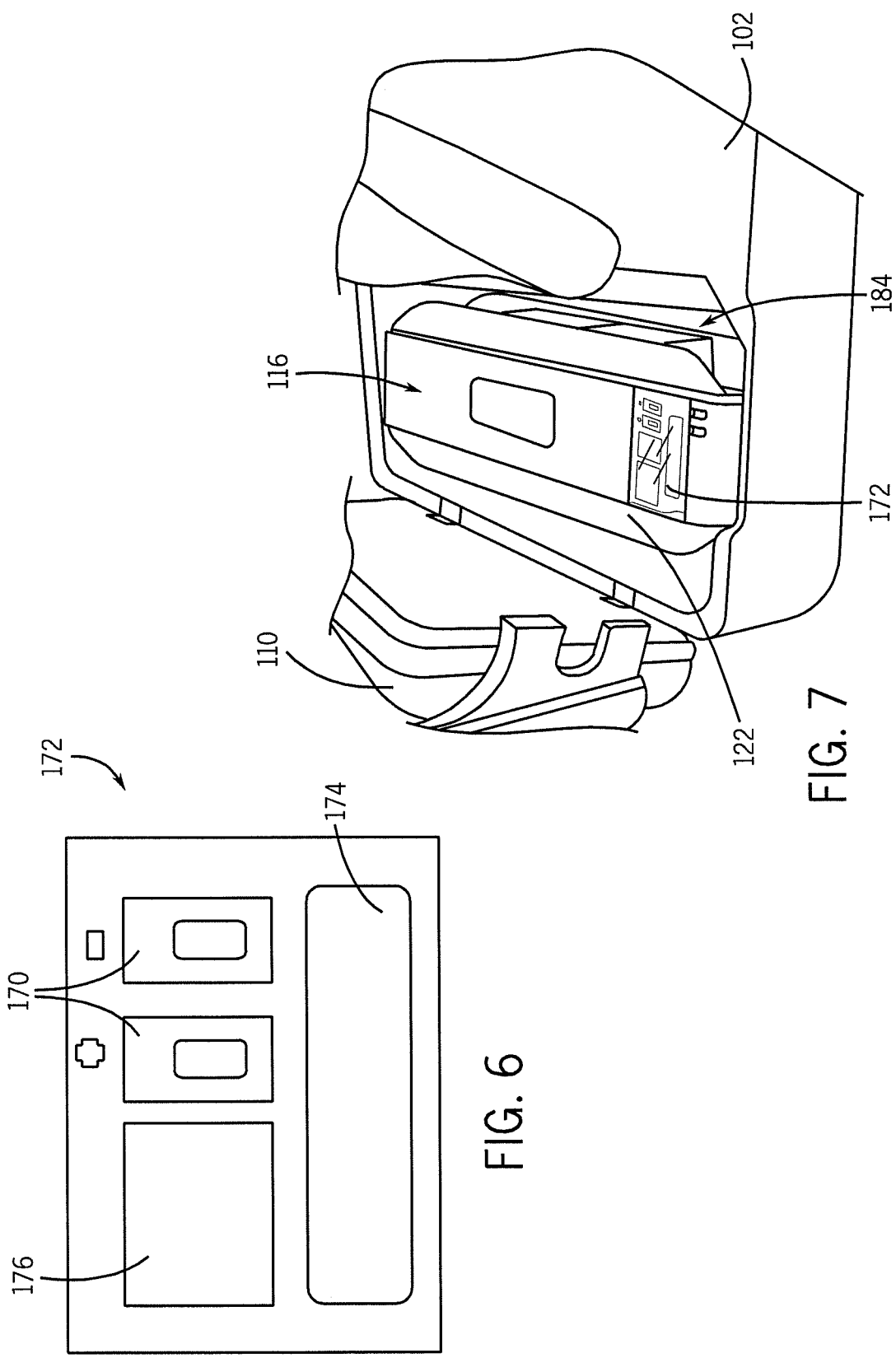

BATTERY SYSTEM, HOUSING AND VEHICLE INCLUDING BATTERY SYSTEM

CROSS-REFERENCE TO RELATED APPLICATIONS

The present application claims priority as a divisional application of U.S. patent application Ser. No. 13/571,220 filed Aug. 9, 2012, entitled "Battery System, Housing & Vehicle Including Battery System," now U.S. Pat. No. 9,472,791, which claims priority to U.S. Provisional Patent Application No. 61/522,497, filed Aug. 11, 2011, entitled "Battery System," the contents of each of which are incorporated herein by reference in its entirety.

FIELD

The present inventions relate to vehicles such as golf cars or carts, utility vehicles and neighborhood electric vehicles. The present inventions more specifically relate to battery systems, housings for battery systems and bodies for such vehicles.

BACKGROUND

Vehicles such as golf cars and carts typically include a frame, a body mounted to the frame, three or four wheels rotatably connected with the frame and a power system operably connected with a wheel drive assembly. Power systems for these vehicles include an electric motor, and one or more batteries, and other electrical components. The batteries may alternatively be coupled to an internal combustion engine.

Power systems common to electric motor powered vehicles, such as a golf car or cart, commonly include multiple batteries that are individually installed and connected in series by a variety of cables. These batteries are individually retained in place with individual battery hold downs that removably attach the battery to the frame of the vehicle. It is also known to provide the individual batteries underneath the seat of such vehicles. Unfortunately, these battery systems are difficult to install and/or replace as individual batteries must be separately installed and electrically connected below the seat, and include multiple parts for installation. Further, such batteries are typically delivered for installation with no electrolyte. As a result, before the batteries are usable, the vent caps must be removed from each battery and each battery filled with fluid. Likewise, ongoing maintenance of the batteries requires each individual battery to be separately filled with electrolyte or other fluid.

SUMMARY

Accordingly, a battery system for use in a vehicle is provided. The battery system includes a tray having a plurality of battery receptacles. A plurality of batteries are also provided, each battery in the plurality of batteries being received in a battery receptacle. A conductive layer in electrical communication with the plurality of batteries and a terminal for electrically coupling to a vehicle are also provided in the battery system. A cover interlocks with the tray. The cover carries a computer and a diagnostic identification system for the plurality of batteries.

A housing for a battery system is also provided. The housing includes a tray having a plurality of receptacles sized to carry batteries, an elevated floor providing an area of clearance below the floor, and apertures in the receptacles in communication with the area of clearance. A cover interlocks with the tray. The cover has a leg which extends and couples to the tray.

A vehicle is also provided. The vehicle has a power system coupled to driven wheels and a battery system docking area. The battery docking area has a drawer to rack system. A battery system is provided which is movable on the drawer to rack system into and out of the docking area. A self-docking plug-in system defined by an electrical coupling of the battery system and the power system is also provided.

These and other features and advantages of devices, systems, and methods according to this invention are described in, or are apparent from, the following detailed descriptions of various examples of embodiments.

BRIEF DESCRIPTION OF DRAWINGS

Various examples of embodiments of the systems, devices, and methods according to this invention will be described in detail, with reference to the following figures, wherein:

FIG. 6 is a top elevation view of the battery system shown in FIG. 3, taken from line 6-6 of FIG. 4, showing one or more examples of a control system;

FIG. 7 is a partial perspective view of the vehicle shown in FIG. 1, showing a battery system of FIG. 3 installed in the vehicle;

It should be understood that the drawings are not necessarily to scale. In certain instances, details that are not necessary to the understanding of the invention or render other details difficult to perceive may have been omitted. It should be understood, of course, that the invention is not necessarily limited to the particular embodiments illustrated herein.

DETAILED DESCRIPTION

Figure 1:
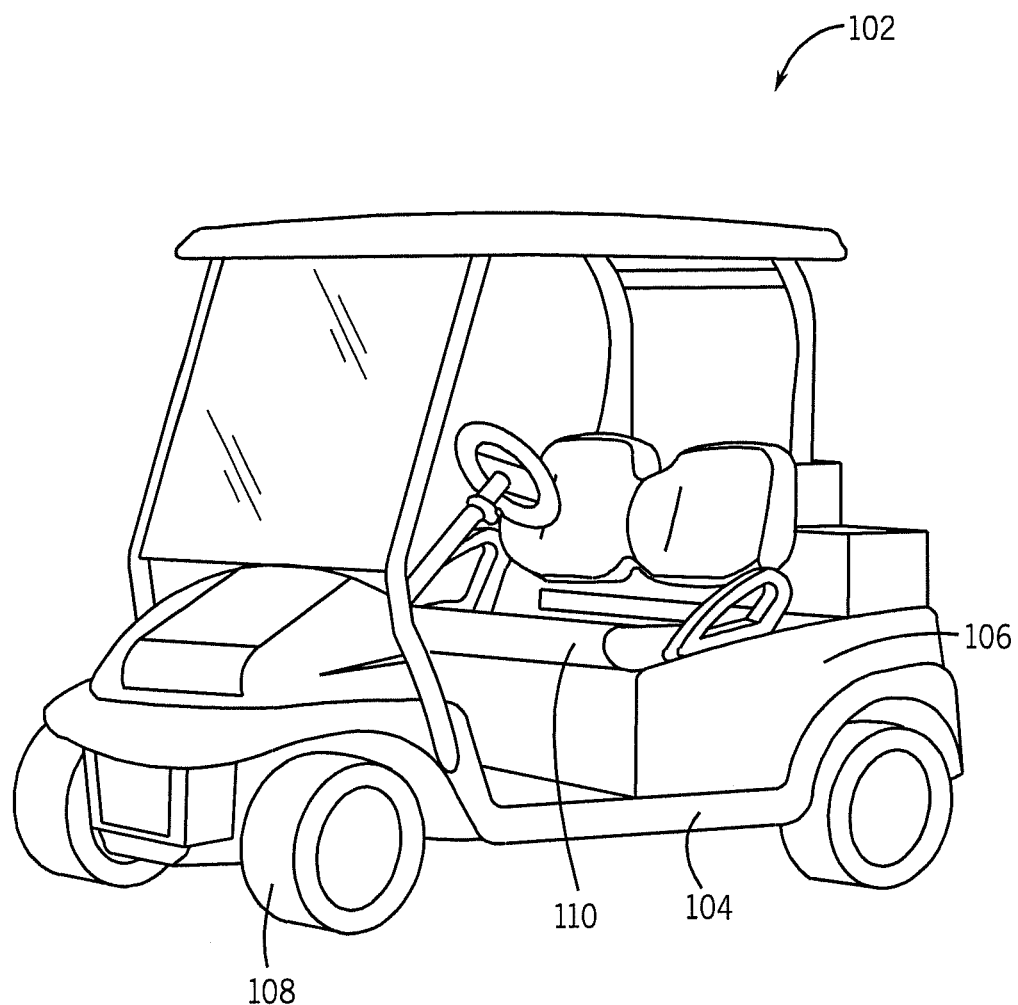
FIG. 1 is a perspective view of an example vehicle for use with one or more examples of embodiments of the battery system described herein.

A vehicle 102 is shown in FIG. 1. The vehicle 102 may include a battery system according to one or more examples of embodiments. The vehicle 102 in the illustrated examples is a golf car or cart. However, according to various alternative examples of embodiments, the vehicle 102 may be any variety of types of vehicles including, among others, utility vehicles, all-terrain vehicles, neighborhood electric vehicles, and recreational vehicles. The vehicle 102 may also be other vehicles utilizing multiple batteries. According to one or more examples of embodiments, the vehicle 102 uses one or more electric motors for locomotive purposes. However, use of the battery system in combination with an internal combustion engine is also contemplated.

Figure 2:
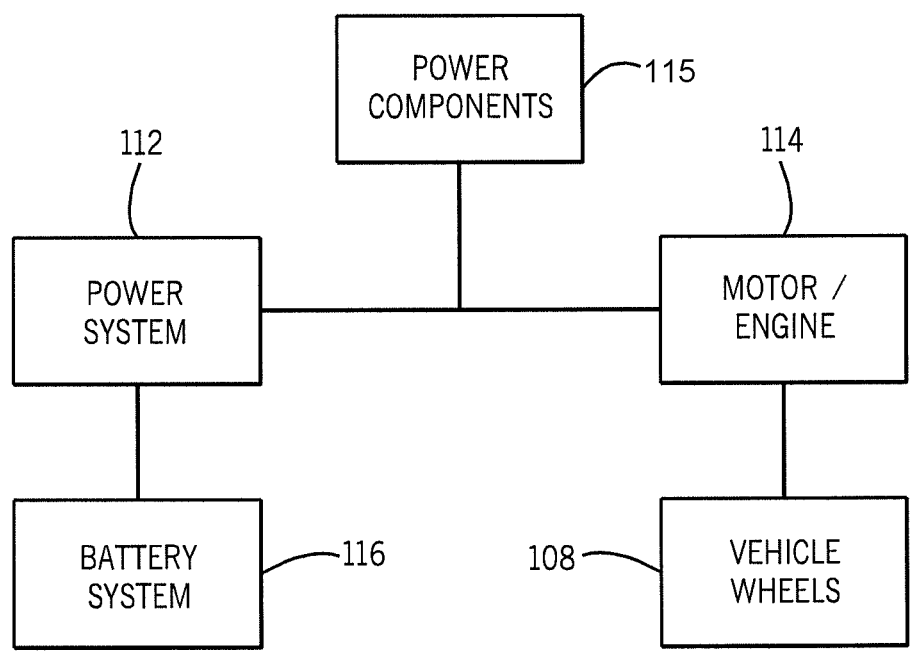
FIG. 2 shows a representation of one or more examples of a power system.

Generally, the vehicle 102 is formed of a frame 104, a body 106 coupled or mounted to the frame, a plurality of wheels 108 rotatably connected with the frame, and a power system operably connected with a wheel drive assembly to drive one or more wheels 108 from the plurality of wheels. The vehicle 102 includes a seat 110 or seating system. The seating system 110 may be integral or otherwise attached to the body 106, or it may be configured to be removably coupled to the body. Referring to FIG. 2, the power system 112 generally includes a motor 114 (such as an electric motor), power components 115 necessary to operate the motor and/or vehicle, and a battery system 116. As indicated, the power system 112 may also include an internal combustion engine. One or more components of the power system 112 may be coupled or mounted to the frame 104 and/or the body 106 of the vehicle 102.

A battery system 116 for use with the vehicle 102 and/or power system 112 is shown in FIGS. 3-15. According to one or more examples of embodiments, the battery system 116 generally includes a housing 118 formed of tray 120 or framework or base and a cover 122, a plurality of batteries 124, and conductive layer or wiring or a wiring harness 126. In various embodiments, the battery system 116 may also be coupled to a computer 128.

Figure 3:
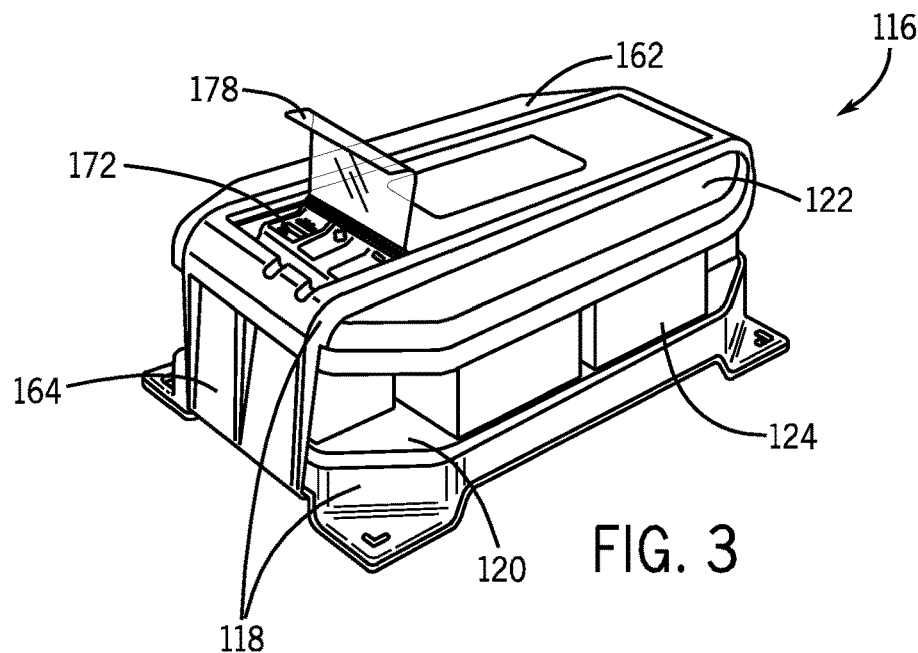
FIG. 3 is a perspective view of a battery system according to one or more examples of embodiments.
Figure 4:
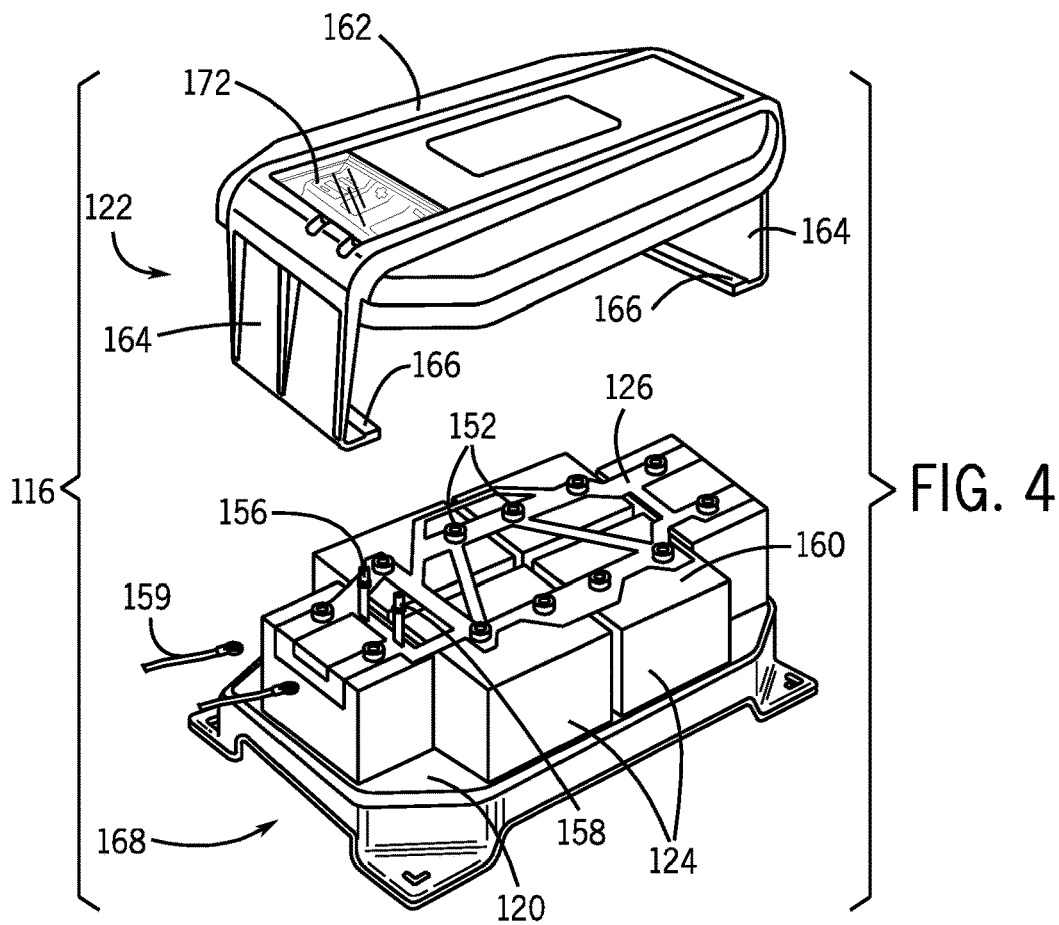
FIG. 4 is a partial exploded perspective view of the battery system shown in FIG. 3, showing vehicle electrical coupling elements, batteries, and the housing of the battery system according to one or more examples of embodiments.
Figure 5:
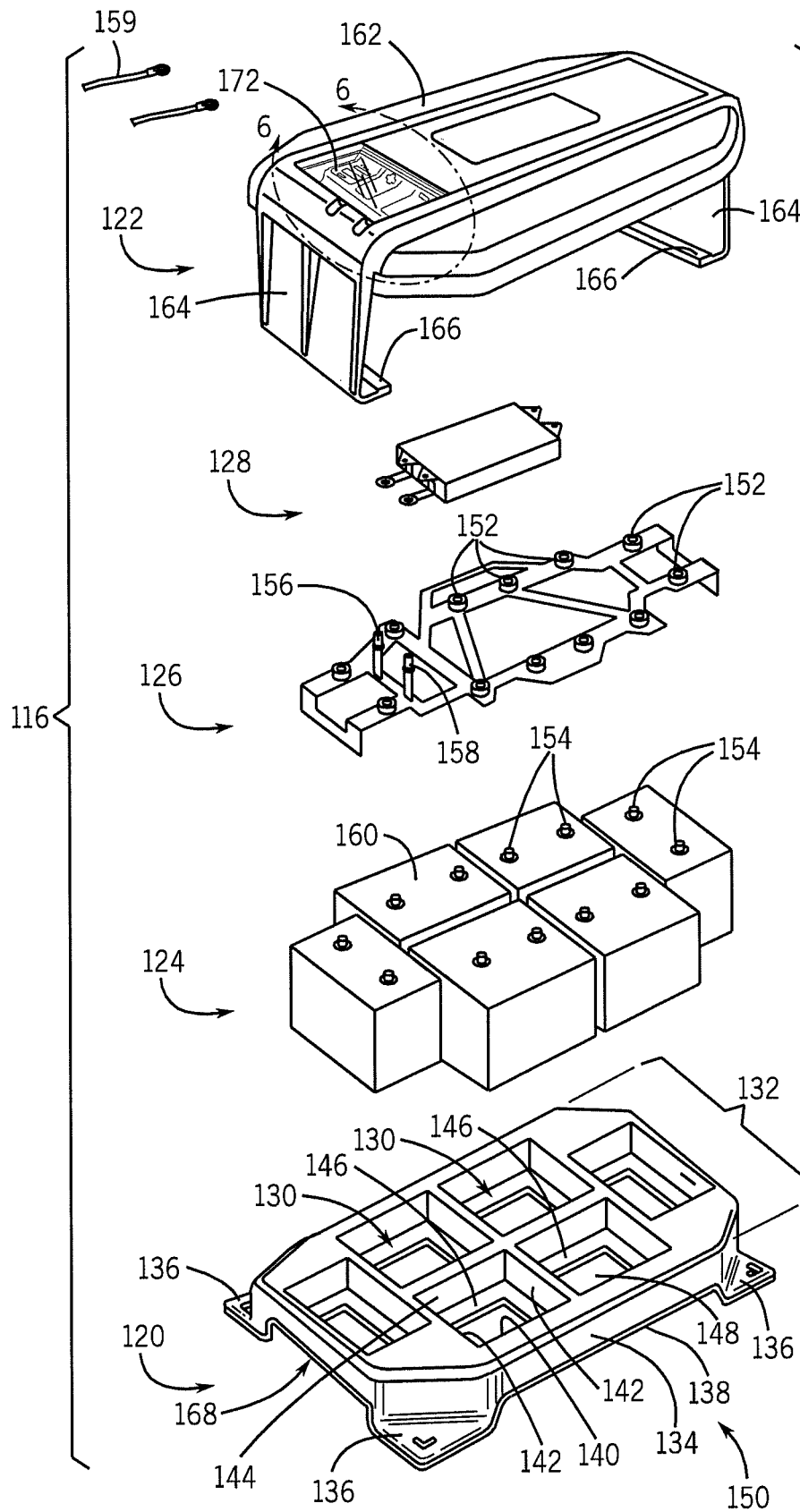
FIG. 5 is an exploded perspective view of the battery system shown in FIGS. 3-4.

As shown in FIGS. 3-5, a battery system 116, and in particular the housing 118, includes a base, which may be a tray or framework 120. The tray 120 is arranged to position and/or secure one or more of the batteries 124 of the battery system 116 during shipping, installation, and/or use.

In the illustrated example shown in FIG. 5, the base or tray 120 has multiple cavities or receptacles or compartments 130 configured for positioning multiple batteries 124. Six cavities 130 are shown in FIG. 4. The cavities 130 are shown as two rows of two, bookended with a single cavity on each side. The cavities 130 form a battery support area 132 on the tray 120 for carrying or supporting the batteries 124. The cavities 130 are surrounded by a frame 134. The frame 134 may also include one or more legs 136 or feet or other features which raise the floor 138 of the tray 120 above the supporting surface, providing space 150 below. Further, or in the alternative, clearance or space or apertures may be provided on the lower edge of the frame 134 between the floor 138 and the supporting surface.

In one or more examples of embodiments, each cavity 130 or receptacle has a front wall 140, end walls 142, a rear wall 144, and a bottom wall 146. The bottom wall 146 may be provided at the bottom edge of the front, and in rear walls. In other various embodiments, the bottom wall 146 may be provided away from the bottom edge of the front wall 140, end walls 142, and/or rear wall 144, for instance, to allow air to pass below the battery 124. As shown in FIG. 5, one or more of the cavities 130 or receptacles may have an aperture 148, such as for example a partially opened bottom wall, which exposes the bottom of a battery held in the cavity 130. The apertures 148 may be in direct communication with the space 150 below the floor 138 of the tray 120.

While the cavities 130 or receptacles are shown in FIG. 5 in a particular configuration, it should be appreciated that the cavities 130 may be provided or configured in any suitable configuration. For example, while six cavities 130 are shown in FIG. 5, the base or tray 120 may include any number of cavities. Further, while the cavities 130 in FIG. 5 are shown as two rows of two, bookended with a single cavity on each side, other configurations may be utilized (e.g., a two-by-three configuration or two-by-two bookended one each side by an offset cavity). Likewise, while apertures 148 are illustrated in the cavities 130, the cavities may be provided without apertures or openings, or the aperture may be located in other locations within the cavity or receptacle.

In various embodiments, the base, tray or framework 120 is integrally formed or connected (e.g. of one-piece construction). However, it should be appreciated that the base, tray or framework 120 may include separate pieces coupled together (e.g., by brackets, fasteners, plastic fusion, or other now known or future developed means).

One or more batteries 124 may be received in the base or tray 120 in the various receptacles 130. The batteries 124 may be provided in the base or tray 120 in any suitable configuration. The batteries 124 shown in FIGS. 3-5 may include any type of secondary battery (e.g., rechargeable battery). According to one or more examples of embodiments, the batteries 124 include a lead-acid storage battery. Lead-acid storage batteries may be either sealed (e.g., non-maintenance) or unsealed (e.g., wet). According to one or more examples of embodiments, the lead-acid storage battery is an unsealed lead-acid battery that periodically requires the addition of electrolyte and/or water to maintain a desired volume and/or concentration of either or both. Each battery 124 includes a positive and a negative terminal for electrically coupling the battery to another device. FIGS. 4-5 show six unsealed 8-volt batteries. However, the type, number and voltage of the batteries 124 may vary according to the intended use or requirements.

In various examples of embodiments, the battery system 116 includes a conductive layer, wiring harness or wiring 126 for electrically coupling the batteries 124 together and/or to the vehicle 102 (see FIGS. 4-5). The conductive layer 126 is in electrical communication with a plurality of batteries 124 and the power system 112 or vehicle 102. In one example, the batteries 124 are coupled in series, although alternative arrangements suitable for the purposes of the battery system 116 may also be acceptable. The conductive layer or wiring harness 126 may be a single or one-piece wiring harness, wherein the wiring includes connectors 152 or other members for coupling the positive and negative terminals 154 of the batteries 124 to the wiring 126. The coupling elements 152, as well as the wire or cable 126, are formed of or include conductive material for transmission of current. The coupling elements 152 may be arranged or shaped to be received on a battery terminal 154 and are spaced along the wiring harness 126 so as to be positioned over a battery terminal from a battery 124 carried by the tray 120. Accordingly, the wiring harness 126 has a plurality of coupling elements 152 interspersed on the cable or wire or conductive layer 126, and connected for the desired battery configuration, e.g., in series. As a result, the wiring harness 126 makes all the necessary electrical contacts with the battery or plurality of batteries 124. In various examples of embodiments, the wiring 126 also includes a positive terminal 156 and a negative terminal 158, or more than one such terminal. The positive and negative terminals 156, 158 may be arranged to be accessible from the exterior of the battery system 116, or for example from the battery cover 122. In one or more examples of embodiments, the cover provides electrical access to the terminals 156, 158, either providing physical access to the terminals, or by providing a separate terminal or terminals in electrical communication with the conductive layer terminals 156, 158. Terminals 156, 158 may be coupled to the power system terminal cables 159 directly or indirectly via electrical connection with conductive elements in the cover. While the wiring 126 is shown in FIGS. 4-5 as being a single or one-piece wiring harness, it should be appreciated that the wiring or conductive layer 126 may include any number of components, segments, or pieces.

The wiring harness or conductive layer 126 may also be linked or coupled to a computer 128 (FIG. 5), such as, in one example, an on-board computer. For instance, a positive terminal 156 and a negative terminal 158 of the wiring 126 may be coupled to one or more computers 128. One or more examples of a computer 128 are shown in FIG. 5. The computer 128 may be carried by the cover 122 of the battery system 116, or may alternatively be carried by the tray 120. For example, the top portion 162 of the cover 122 may carry an on-board computer 128. The computer 128 may be any suitable computer, including for example, an on-board computer, an on-board battery charger computer, a controller, a solenoid, and/or other electrical components. As one of ordinary skill in the art will appreciate, however, the batteries 124 or wiring 126 do not need to be coupled to an on-board computer 128. Further, it should be appreciated that the batteries 124 may be coupled to a computer 128 which is not provided within the battery system housing 118. The computer 128 may be provided for any suitable purpose, including, but not limited to, the following: monitoring the service and condition of batteries 124, providing data on use; controlling the battery system 116 and/or power distribution; controlling on/off; and/or controlling the battery system display.

As shown in FIGS. 3-5, in one or more examples of embodiments the battery system 116 also includes a cover 122. The cover 122 may be disposed on the batteries 124. The cover 122 encloses or covers the batteries 124 carried by the tray 120. In the illustrated example, the cover 122 extends over the top surface 160 of the batteries 124. The cover 122 may be releasably or hingedly or pivotably coupled to the base or tray 120 of the system. The cover 122 is formed of a top portion 162 and one or more legs 164 extending therefrom. In the illustrated example, legs 164 extend below the top portion 162 of the cover 122 from positions proximate to the ends of the top portion 162. The leg or plurality of legs 164 space the cover 122 a distance away from the tray 120. Preferably, the distance corresponds to, at least, the height of the batteries 124 carried by the tray 120. Each leg 164 may include a flange 166 or other interlocking member which couples to, or is supported on or near, the base or tray 120. The flange 166 or leg 164 may couple to the tray 120 on one or more surfaces, such as a side surface, and may, further couple in a corresponding receptor 168, For example, a leg 164 may interlock with the tray 120 by a snap-fit or friction-fit type arrangement, or in the alternative may interlock via a tongue and groove type arrangement.

The cover 122 may also optionally include or be associated with a fluid delivery system. The fluid delivery system may be utilized to provide fluid, such as water or electrolyte, to one of the batteries 124 or multiple batteries, simultaneously or in sequence. As a result, a one-step fluid fill and flood system may be provided in association with or in connection with the cover 122. To this end, a fluid port or receptacle, along with a delivery system connected with or connectable to the various batteries 124 in the battery system 116 may also optionally be provided in association with the cover 122. Further, this system may be arranged to provide a one-step fill system with overflow. The cover 122 may also include vent caps (not shown), such as vent caps integral to the cover 122. In various alternative examples of embodiments, however, the vent caps may be provided separately from the cover 122, such as for example by use of single or gang vents.

The cover 122 may provide access to the terminals 156, 158 of the wiring or wiring harness 126. To this end, access openings may be provided in the cover 122. In FIGS. 3-6, access openings are provided in the top portion 162 of the cover 122. In various alternative examples of embodiments, the cover 122 includes terminals that are electrically coupled to the wiring harness 126 and/or terminals of the wiring harness. As a result, a quick-connect coupling mechanism ma be provided for coupling to the vehicle positive and negative terminal wiring.

Accordingly, as shown in FIGS. 6-7, a service panel 172 or compartment may be provided on the top portion 162 of the cover 122. The service panel 172 may include positive and negative terminals 170, or access thereto. Fluid delivery system inlet or inlets or port(s) 174 may, optionally, be included in the service panel 172. The service panel 172 may also include a diagnostic identification system 176. For example, a diagnostic display device 176 may be used, such as but not limited to an LCD screen, to communicate information regarding the battery system 116 and may further be coupled to a computer system 128, such as an on-board computer system, which controls the display. The information may include any suitable information for operation, maintenance, or general knowledge of the battery or battery system 116. For example, the information may include, but is not limited to, the condition or service requirements of the battery system 116, or other information from the on-board computer 128 or detectable from the battery system components. The compartment or service panel 172 may include a removable or hinged door or cover 178 for the compartment (see FIG. 3).

While the service panel 172 is specifically described above in relation to the top portion 162 of the cover 122, alternative locations for the service panel and other/additional components contained within the service panel may also be acceptable for the purposes provided.

The battery system cover 122 may be integrally formed or connected, such as by one-piece construction. In one or more examples of embodiments, the cover 122 is formed by blow molding a plastic material. However, it should be appreciated that the cover 122 may be formed of different materials, by different processes, and/or include separate pieces coupled together (e.g., by brackets, fasteners, plastic fusion, etc.)

In one or more examples of embodiments, the power system 112 and, in particular the battery system 116, is disposed on, and may be at least partially disposed inside the body 106 of the vehicle 102. In one or more examples of embodiments, the base, tray or framework 120 may be mounted to the vehicle 102 such as, for example, to the frame 104 or body 106. In various embodiments, the base or tray or framework 120 may be formed and/or mounted to stiffen or increase rigidity of the vehicle 102 (e.g. frame, body, or other vehicle component).

Figure 8:
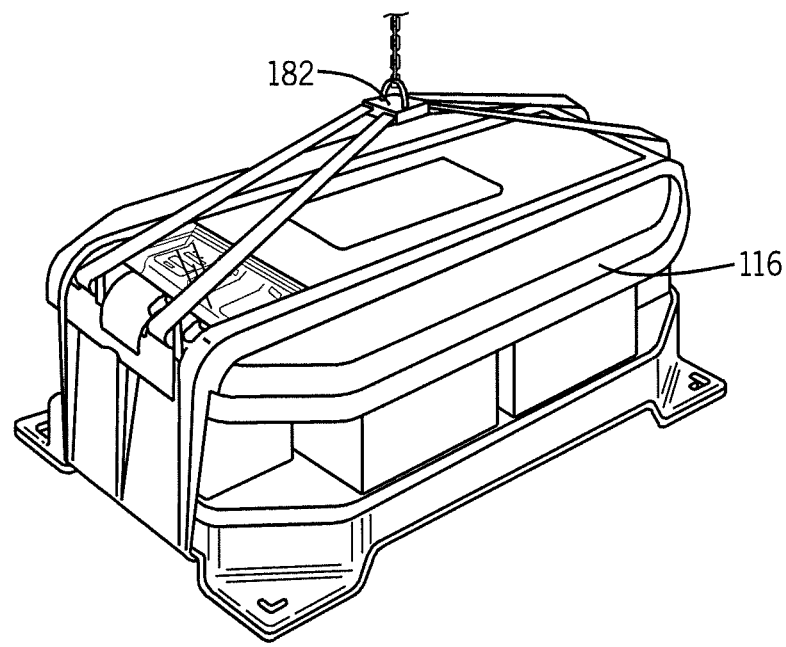
FIG. 8 is a perspective view of the battery system shown in FIG. 3, showing the battery system connected to a lift.
Figure 9:
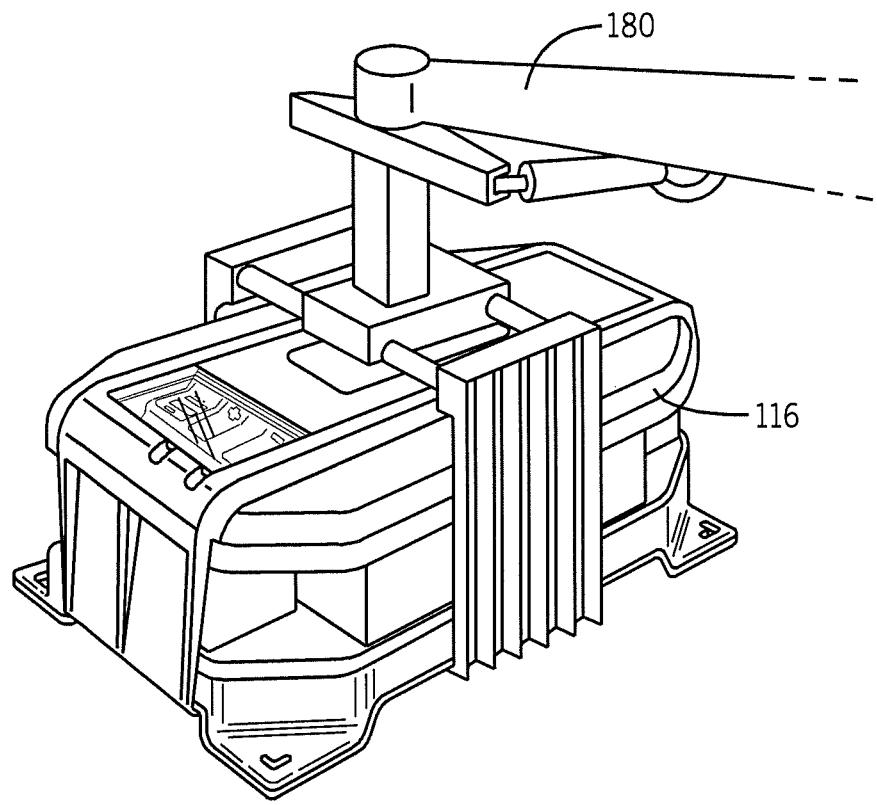
FIG. 9 is a perspective view of the battery system shown in FIG. 3, showing the battery system connected to a hoist.

As can be seen in FIG. 1, the body 106 of the vehicle 102 includes one or more seats 110 for vehicle occupants. In one or more examples of embodiments, one or more of the seats 110 may be moved, removed or otherwise adjusted to allow, or provide access to the battery system 116. For example, the battery system 116 may be installed below the seat 110 or seats of the vehicle 102 as shown in FIG. 7. In this regard, the battery system 116 may be installed by any suitable means, examples of which include a lift 180 or hoist 182 as shown in FIGS. 8-9. The base or tray 120 may rest within the battery bay 184 or receptacle in the vehicle 102, and may further be secured or mounted in place within the battery bay 184, such as by fasteners secured to the legs or feet 136 of the battery system base 120.

Figure 10:
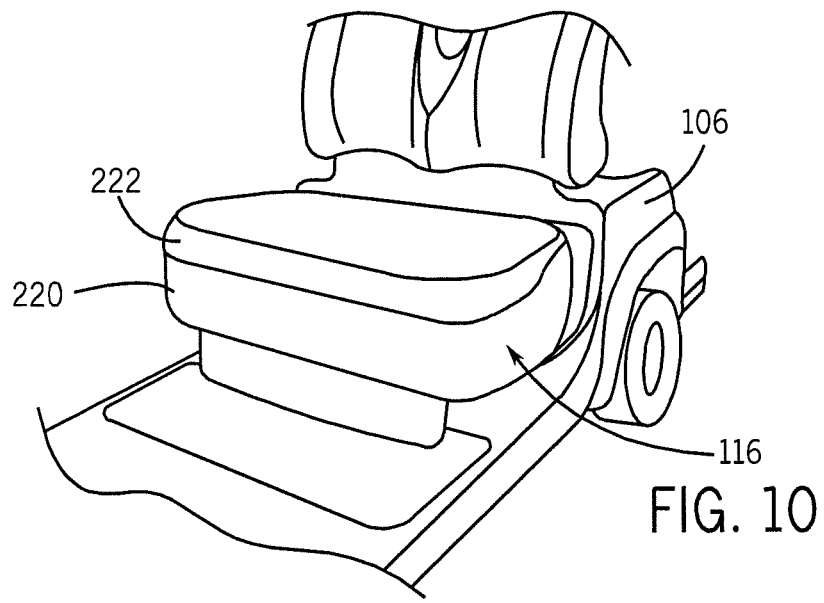
FIG. 10 is a partial perspective view of one or more alternative examples of embodiments of the battery system described herein, showing a vehicle including a battery system housing with seat.
Figure 11:
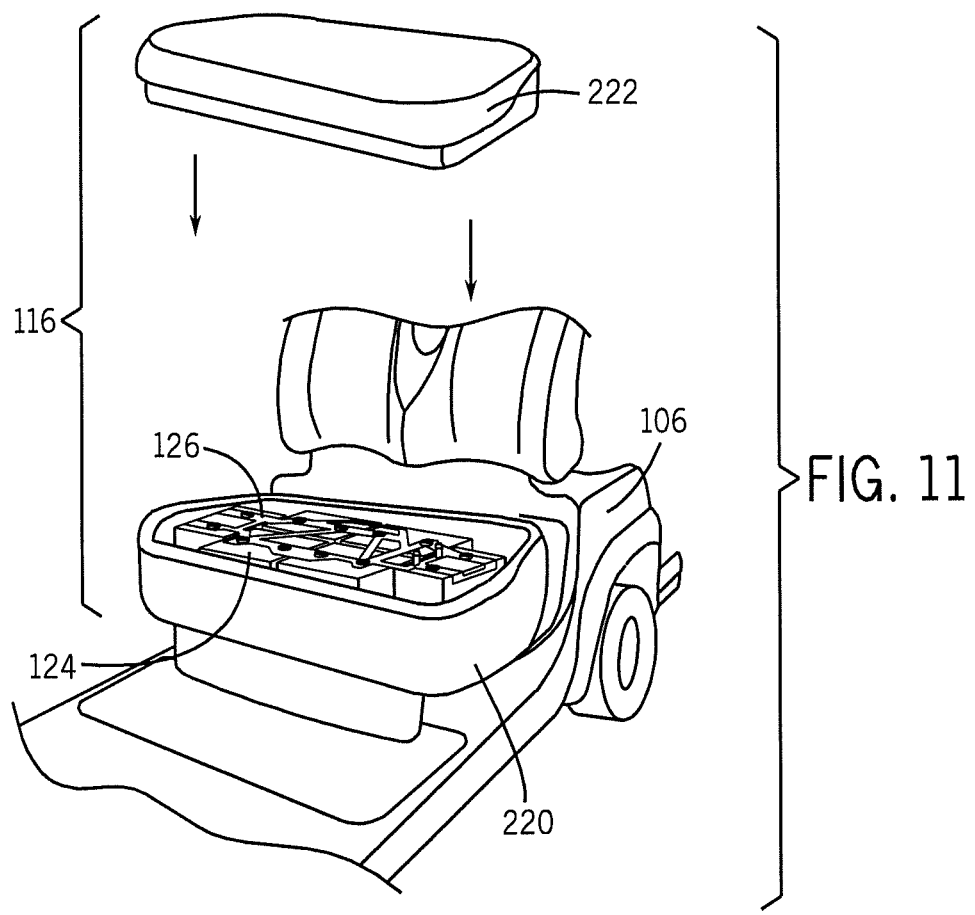
FIG. 11 is a partial exploded perspective view of the vehicle and battery system housing shown in FIG. 10, showing the seat and battery system cover separated.
Figure 12:
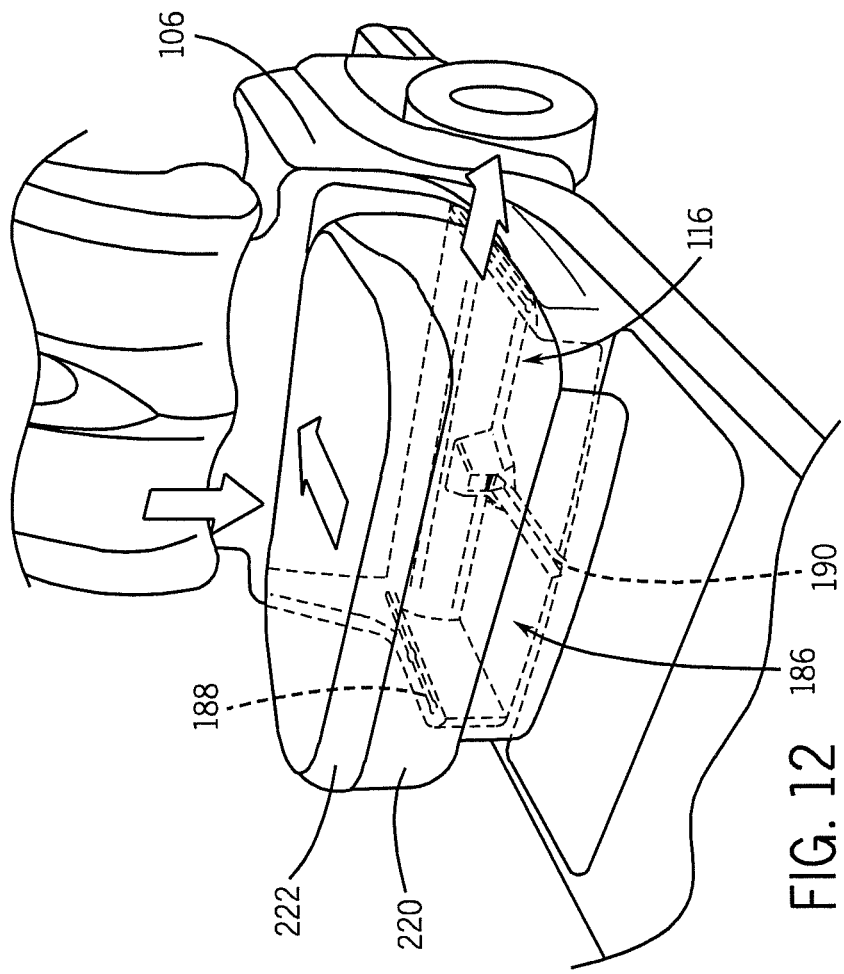
FIG. 12 is a partial perspective view of one or more alternative examples of a vehicle and battery system, showing one or more examples of a coupling of the battery system to one or more components of a vehicle.

In various alternative examples of embodiments, the cover 222 of the battery system 116 may include or be comprised of one or more seats 210. As shown in FIGS. 10-12, the cover 222 and seat 210 may be coupled or removably coupled together, such as for example, by brackets, fasteners, plastic fusion, or other now known or future developed means. However, the cover 222 and seat 210 may integrally formed or connected (e.g., of one-piece construction). The battery system 116 may also include a seat 210 on, or as the battery system cover 222. In this regard, the battery system 116 includes a cover 222 with integrated seats 210 which can be removed to access the batteries 124.

Figure 13:
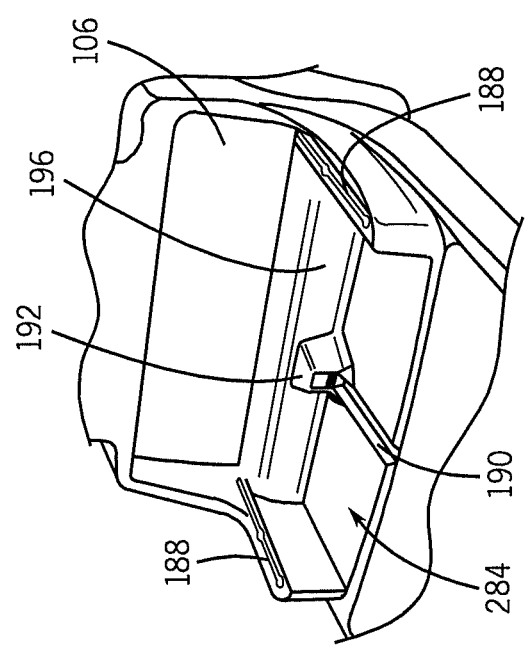
FIG. 13 is a partial perspective view of the vehicle shown in FIG. 12, showing one or more examples of embodiments of rails configured to help couple a battery system housing with seat into a vehicle.
Figure 14:
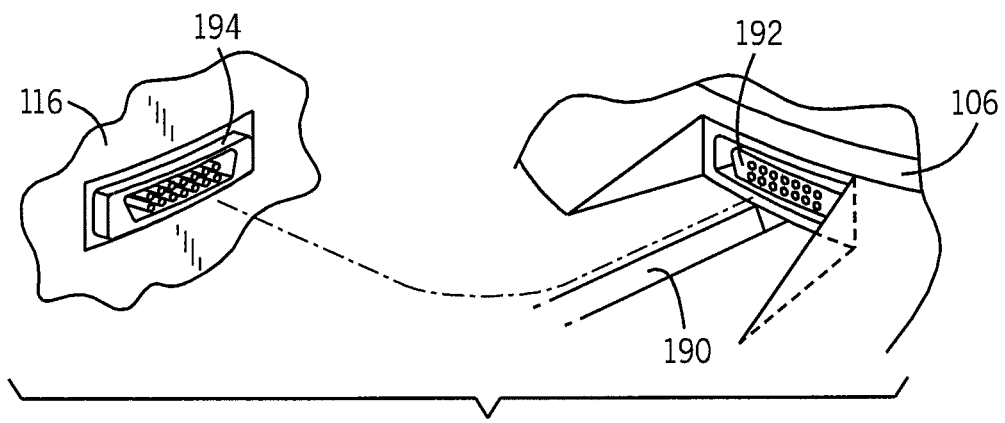
FIG. 14 is a partial perspective view of the vehicle shown in FIG. 12, showing one or more examples of a coupling system for coupling the battery system to the vehicle.

As shown in FIGS. 12-14, the body 106 of the vehicle 102 may include an apparatus configured to releasably couple a battery system 116 to the body 106 of the vehicle 102. In one or more examples of embodiments, the body 106 of the vehicle 102 is provided with "drawer-to-rack" system 186. The system 186 in the illustrated embodiment includes a rail 188 or groove 190, or other member(s) such as rollers or a slide rail, which receives a portion of the battery system 116. In particular, the battery system 116 may be mounted on the drawer-to-rack system 186, (e.g., slidable on the rail 188 or groove 190). In the illustrated example, a plurality of rails 188, such as for example two or three rails or combination of rails and grooves, are provided for slidable coupling or movement of the battery system 116. The battery system base 220 or cover 122 or 222 may be provided with a mating apparatus, e.g., a rail or groove or other suitable device, which corresponds to the apparatus on the vehicle body 106 configured to releasably couple the battery system 116 which is moveable thereon. A docking area 284 may also be provided on the body 106 of the vehicle 102 which is sized to receive the battery system 116 and base 220. The battery system 116 is moveable into and out of the docking area 284. While the members shown in FIGS. 12-14 are slide rails 188 or grooves 190, it should be appreciated that any number of configurations may be utilized to releasably couple the battery system 116 with seat 210 to the body 106 of the vehicle 102. For example, the battery system 116 with seat 210 may be provided into a compartment designed to releasably couple the system to the body 106.

Referring to FIGS. 12-14, a self-docking plug-in system or attachment may also be provided on the body 106 of the vehicle 102 for electrically coupling the battery system 116 to the vehicle. The self-docking system includes, or is defined by a plug arrangement 192 in a surface of the vehicle body 106 in proximity to the battery system 116. The plug arrangement 192 of the vehicle 102 is electrically coupled to the power system 112 or to the components of the vehicle 102 operated by a power system 112. The battery system 116 or power system 112 includes and, thus, the self-docking plug in system is further defined by a corresponding or mating plug arrangement 194 on a surface of the cover or base of the battery system 116 which is aligned with the body 106 plug arrangement 192 upon installation. The mating plug arrangement 192, 194 is electrically coupled to the conductive layer 126 of the battery system 116, such as for example, to a terminal of plurality of terminals, or may form the terminals. The installed battery system 116 in the battery bay or docking area 284 causes the coupling of the mating plug arrangement 192, 194, thereby electrically coupling the battery system 116 to the power system 112 and vehicle 102. In the illustrated examples shown in FIGS. 12-14, at least a portion of the self-docking plug-in system 192 is installed on a wall 196 of the docking bay 284, such that upon sliding of the battery system 116, with corresponding plug-in arrangement 194 aligned, into place on the vehicle 102 also electrically couples the battery system to the vehicle.

Figure 15:
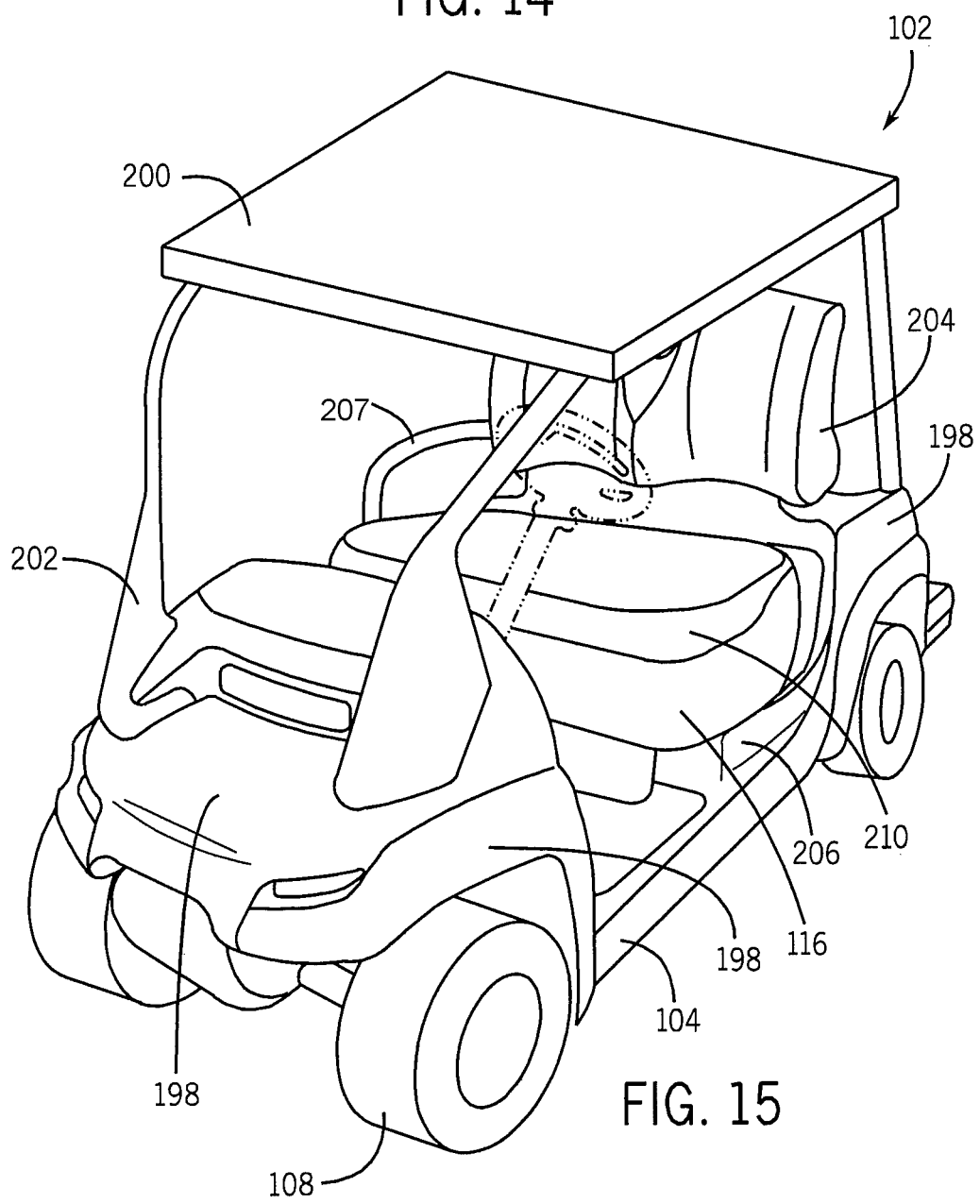
FIG. 15 is a partial perspective view of one or more alternative examples of a vehicle and battery system as described herein.

Referring to FIG. 15, in various examples of embodiments, the vehicle 102 may also include other modular components that may be coupled (e.g., releasably coupled) to the body 206. The modular components or trim may include body panels 198 or plastics, an overhead canopy 200, supports for an overhead canopy 202, HMI/electronics, seatbacks 204, armrests 207, structural accessory mounts including, without limitation, golf bag supports, bumpers, etc. In various embodiments, the modular components may improve ease of assembly, and/or repair of the vehicle 102. Further, one or more of the components may be coupled to the power system 112 or battery system 116 providing an integrated vehicle system.

As indicated in the Figures, many components, such as the cover and base of the power system, the vehicle trim and other panels and components of the vehicle, and the like, are constructed of one or more now known or future developed plastic materials. The various components may be constructed, fabricated, or formed of any number or variation of known or hereafter-developed polymers, copolymers, or other materials including, without limitation, thermoplastics such as for example polyethylene or polypropylene, nylon, fiberglass, fiberglass filled nylon, fiber reinforced polymer (e.g. glass fiber reinforced polymer). Further, these materials may be formed from any number of known or hereafter developed processes including, without limitation, blow-molding, injection molding, gas-assist injection molding, compression molding. It should be appreciated, however, that any or all of the components may be constructed of any known or hereafter developed material or materials suitable for the intended purposes.

In one or more examples of embodiments, the battery system 116 may be assembled by placement of one or more batteries 124 in receptacles 130 of the tray 120, coupling the conductive layer to the battery terminals 154, optionally connecting a computer 128 to the conductive layer, and attaching the cover 122 to the tray 120 by the mechanisms described hereinabove. The computer may alternatively be coupled to the cover prior to attachment to the conductive layer. The batteries 124 may be provided in a filled or unfilled state. Accordingly, unfilled batteries may be filled prior to assembling the conductive layer and/or cover to the battery system, or in the alternative may be filled following assembly, such as in some examples following installation in a vehicle. Once the battery system 116 is assembled, it is installed in a vehicle 102 as previously described herein.

The vehicle, body, battery system and/or housing described herein include a number of advantages over traditional systems. The battery system provides reduced battery watering effort, time and/or costs as it permits simultaneous watering of multiple batteries. The battery system, as an integrated unit also reduces maintenance effort, time and/or costs, as each battery does not need to be tended individually. Furthermore, the system described herein, including a diagnostic display device, reduces diagnostic effort, time and/or costs because such information is readily available on the battery system cover.

The housing, including base and cover, of the battery system provides improved stiffness and/or rigidity of the frame, body and/or vehicle. The elevated floor and/or clearance or apertures of the tray provide an area below the floor of the tray for air to circulate and assist in cooling the batteries and/or battery system.

The combined battery system includes fewer parts, and results in reduced vehicle, housing and/or battery system volume, as well as reduced vehicle, housing and/or battery system weight. These reductions from the use of the integrated battery system also improve storage and/or comfort in the vehicle.

The battery system provides improved battery and component connections permitting quick connect and disconnect of the battery system from the power system and vehicle. The battery system also provides improved performance. For example, the battery system has improved cooling, improved vehicle range per charge, and improved battery life and/or performance because of the various features identified herein.

Additionally, the integrated system including multiple batteries and associated components described herein reduce shipping effort, time and/or costs; as well as delivery effort, time and/or costs; storage effort, time and/or costs; and installation effort, time and/or costs. Moreover, there are fewer components and/or parts in the integrated battery system, and as a result, fewer stock-keeping units (SKUs) for manufacturers, suppliers, sellers, and purchasers. Furthermore, one or more features of the battery system may be used for other manufacturer purposes, such as for example use of the tray for a shipping pallet.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that references to relative positions (e.g., "top" and "bottom") in this description are merely used to identify various elements as are oriented in the Figures. It should be recognized that the orientation of particular components may vary greatly depending on the application in which they are used.

For the purpose of this disclosure, the term "coupled" means the joining of two members directly or indirectly to one another. Such joining may be stationary in nature or moveable in nature. Such joining may be achieved with the two members or the two members and any additional intermediate members being integrally formed as a single unitary body with one another or with the two members or the two members and any additional intermediate members being attached to one another. Such joining may be permanent in nature or may be removable or releasable in nature.

It is also important to note that the construction and arrangement of the system, methods, and devices as shown in the various examples of embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements show as multiple parts may be integrally formed, the operation of the interfaces may be reversed or otherwise varied, the length or width of the structures and/or members or connector or other elements of the system may be varied, the nature or number of adjustment positions provided between the elements may be varied (e.g. by variations in the number of engagement slots or size of the engagement slots or type of engagement). The order or sequence of any process or method steps may be varied or re-sequenced according to alternative embodiments. Other substitutions, modifications, changes and omissions may be made in the design, operating conditions and arrangement of the various examples of embodiments without departing from the spirit or scope of the present inventions.

While this invention has been described in conjunction with the examples of embodiments outlined above, various alternatives, modifications, variations, improvements and/or substantial equivalents, whether known or that are or may be presently foreseen, may become apparent to those having at least ordinary skill in the art. Accordingly, the examples of embodiments of the invention, as set forth above, are intended to be illustrative, not limiting. Various changes may be made without departing from the spirit or scope of the invention. Therefore, the invention is intended to embrace all known or earlier developed alternatives, modifications, variations, improvements and/or substantial equivalents.

The invention claimed is:

1. A battery system for use in a vehicle comprising:
a plurality of lead-acid batteries, each lead-acid battery having a positive battery terminal and a negative battery terminal;
a cover; and
a conductive layer comprised of a one-piece wiring harness in electrical communication with the plurality of lead-acid batteries for electrically coupling each positive battery terminal and each negative battery terminal of each of the plurality of lead-acid batteries to a vehicle;
wherein the conductive layer further comprises a plurality of coupling elements each sized to accept a lead-acid battery terminal and connecting respectively to the positive battery terminal and negative battery terminal of each lead-acid battery from the plurality of lead-acid batteries below a bottom surface of the cover; and wherein the one-piece wiring harness is distinct from and disposed below a bottom surface of the cover.

2. The battery system of claim 1 wherein the plurality of lead-acid batteries is approximately six lead-acid batteries.

3. The battery system of claim 2 wherein the conductive layer connects the lead-acid batteries in series.

4. The battery system of claim 1 wherein each positive battery terminal and each negative battery terminal of each of the plurality of lead-acid batteries extends from a surface of each lead-acid battery.

5. A vehicle comprising:
a vehicle body having a power system coupled to driven wheels; and
a lead-acid battery system comprising:
 a plurality of lead-acid batteries, each lead-acid battery having a positive battery terminal and negative battery terminal extending from a surface of the battery,
 a housing comprising a cover; and
 a conductive layer comprised of a unitary wiring harness in electrical communication with each positive battery terminal and each negative battery terminal of each of the plurality of lead-acid batteries for electrically coupling to a vehicle;
wherein the conductive layer further comprises a plurality of coupling elements, each coupling element sized to accept a lead-acid battery terminal and connecting respectively to the positive battery terminal and negative battery terminal of each lead-acid battery from the plurality of lead-acid batteries below a bottom surface of the cover; and
wherein the wiring harness is separate from and below a bottom surface of the cover.

6. The vehicle of claim 5, further comprising a vehicle seat disposed on the battery system.

7. The vehicle of claim 5, further comprising a drawer to rack system for providing the battery system into the vehicle body.

8. The vehicle of claim 7, wherein the drawer to rack system comprises rails or grooves.

9. The vehicle of claim 5, further comprising a self-docking plug-in system comprising a plug arrangement on the vehicle body and a mating plug arrangement on the battery system.

10. The vehicle of claim 9, wherein the conductive layer electrically couples the plurality of batteries and the self-docking plug-in system.

11. The vehicle of claim 5, wherein the plurality of lead-acid batteries comprises six lead-acid batteries.

12. A battery system for use in a vehicle comprising:
a base of a housing, the base including a top surface;
a plurality of lead-acid batteries carried by the top surface of the base, each lead-acid battery of the plurality of lead-acid batteries having a positive battery terminal and a negative battery terminal extending from a surface of the lead-acid battery, the surfaces of the plurality of lead-acid batteries having the positive battery terminals and the negative battery terminals being disposed away from the top surface of the base;
a one-piece wiring harness comprised of conductive material, the one-piece wiring harness being in electrical communication with each positive battery terminal and each negative battery terminal of the plurality of lead-acid batteries for electrically coupling the plurality of lead-acid batteries to the vehicle;
a plurality of coupling elements shaped to receive a lead-acid battery terminal and are received on each positive battery terminal and each negative battery terminal of each lead-acid battery of the plurality of lead-acid batteries; and
a cover of the housing coupled to the base, the cover including a bottom surface disposed above and separate from the one-piece wiring harness.

13. The battery system of claim 12, wherein the base includes a plurality of receptacles, each receptacle of the plurality of receptacles receives a respective battery of the plurality of lead-acid batteries.

14. The battery system of claim 13, wherein the base includes a tray and a frame.

15. The battery system of claim 12, wherein the one-piece wiring harness further comprises a positive terminal and a negative terminal.

16. The battery system of claim 15, wherein the positive terminal and the negative terminal of the one-piece wiring harness are accessible from an exterior of the housing.

17. The battery system of claim 16, wherein the cover has a service panel for electrically coupling the positive terminal and the negative terminal of the one-piece wiring harness to the vehicle and a diagnostic identification system.

18. The battery system of claim 17, wherein each lead-acid battery from the plurality of lead-acid batteries is an eight-volt lead-acid battery.

19. A vehicle having the battery system of claim 17.

* * * * *